UNITED STATES PATENT OFFICE.

ANGEL MIRETE AYALA, OF MADRID, SPAIN.

INDUSTRIAL PRODUCT COMPRISING A SOLDERING SUBSTANCE FOR ALUMINIUM WITH PROCESS FOR OBTAINING IT.

1,333,237. Specification of Letters Patent. Patented Mar. 9, 1920.

No Drawing. Application filed March 8, 1919. Serial No. 281,492.

*To all whom it may concern:*

Be it known that I, ANGEL MIRETE AYALA, subject of the King of Spain, residing at Madrid, Spain, have invented a new and useful Industrial Product Comprising a Soldering Substance for Aluminium with Processes for Obtaining It; and I do hereby declare the following to be a full, clear, and exact description of the same.

Soldering substances for aluminium heretofore proposed, are not only expensive, but their strength is insufficient for employing them in many cases, it happening frequently that under the slightest strain the connection breaks at the place where it had been soldered.

The present invention relates to a method of manufacturing solder and to the new article of manufacture which is not only much stronger than solders previously known, but which is comparatively inexpensive, as regards both manufacture and ingredients.

My new soldering substance is composed essentially of zinc, tin and lead in proportions which may vary according to the results to be obtained.

Extreme limits of the components are as follows:

Zinc _____ from 20% to 70%.
Tin _____ from 15% to 60%.
Lead _____ from 10% to 50%.

Naturally the proportion of each metal varies according to the particular desiratum of the solder, having in view strength as one object, or economy of price as another, so that if the percentage of one metal be increased, that of another or the others will be diminished and vice versa.

The process according to the present invention is as follows:

In a crucible is first put tin, the same being heated until it fuses; afterward lead is added and heated until it is melted and the two said metals are stirred in order to mix them intimately. This operation being finished, zinc is put into the crucible and also melted, and immediately afterward a little more tin and lead are added at the same time. When the mixture is completely melted, it is preferably agitated with an iron or the like, in order to get all the metals well mixed and in a uniform condition, forming a mixture of regular composition, as otherwise the heavier component would settle underneath the other. When the mixture is completed, the same is poured into molds of a convenient shape and left there for cooling.

Soldering with this new soldering substance is effected in the usual way, and it is pointed out that its point of fusion varies between 180° and 250° C.

The strength of my new soldering substance reaches 8½ kilos per square millimeter, depending on the proportions of the mixture.

As the point of fusion, as above stated, varies between 180° and 250° C., the soldering substance can be employed in connection with an autogene blowing pipe, or a blowing pipe for gas or a simple soldering lamp, because the indicated point of fusion admits of the use of any one of these apparatus.

Practice has shown that the proportions, above indicated, of my soldering substance can be restricted and that this substance can be obtained advantageously by the following proportions:

Zinc _____ from 32% to 48%.
Tin _____ from 33% to 46%.
Lead _____ from 15% to 30%.

Within this scale of proportions different mixtures can be chosen, according to the strength desired. As an example it is observed that very good results are obtained with a mixture of 37% to 43% of zinc, 35% to 42% of tin and 17% to 24% of lead.

My soldering substance possesses the further advantage that no acids nor fusing substances are required in the use thereof.

While I have described specific preferable features of the invention, I wish it understood that the same is not limited except as indicated by the appended claims.

What is claimed is:

1. A new soldering substance for aluminium composed of zinc, tin and lead, zinc being included in the proportion of 37% to 43%, tin in the proportion of 37% to 42%, and lead in the proportion of 17% to 24%, the fusion point of the solder varying from 180° to 250° C.

2. A method of making solder, including melting tin in a crucible, adding lead to the molten tin, mixing the molten tin and lead, adding zinc to the molten tin and lead, adding simultaneously tin and lead at the moment the zinc melts, stirring the mixture, and pouring the same into a mold.

In testimony whereof I have signed my name to this specification in the presence of two subscribing witnesses.

ANGEL MIRETE AYALA.

Witnesses:
R. DE SALAR,
LEON GOMEZ HEREDIA.